United States Patent

Schniederjan et al.

[11] Patent Number: 5,184,466
[45] Date of Patent: Feb. 9, 1993

[54] CONTROL AND REGULATING DEVICE FOR A HYDROSTATIC TRANSMISSION

[75] Inventors: Reinhold Schniederjan, D-Neu-Ulm; Ludwig Wagenseil, Vohringen, both of Fed. Rep. of Germany

[73] Assignee: Hydromatik GmbH, Fed. Rep. of Germany

[21] Appl. No.: 746,125

[22] Filed: Aug. 15, 1991

[30] Foreign Application Priority Data

Sep. 18, 1990 [DE] Fed. Rep. of Germany ....... 4029548

[51] Int. Cl.⁵ ................ F16D 31/02; F16D 39/00
[52] U.S. Cl. .................................. 60/448; 60/449; 60/452; 60/487; 60/491
[58] Field of Search ............... 60/443, 444, 448, 449, 60/487, 490, 491, 492, 445, 452

[56] References Cited

U.S. PATENT DOCUMENTS

| | | | |
|---|---|---|---|
| 4,476,680 | 10/1984 | Pollman et al. | 60/443 X |
| 4,543,787 | 10/1985 | Eckhardt | 60/452 X |
| 4,559,778 | 12/1985 | Krusche | 60/452 X |
| 4,802,336 | 2/1989 | Mayr et al. | 60/452 X |

*Primary Examiner*—Edward K. Look
*Assistant Examiner*—John Ryznic

*Attorney, Agent, or Firm*—Scully, Scott, Murphy & Presser

[57] ABSTRACT

The invention relates to a control and regulating device for a hydrostatic transmission which comprises a reversible hydraulic pump that can be driven by a driving motor, at least one hydraulic motor that is connected via two working lines to the hydraulic pump, and an adjusting device that can be acted on by an adjusting pressure for adjusting the volume and direction of displacement of the hydraulic pump, together with a displacement-direction control valve for controlling and regulating the action of the adjusting pressure on the adjusting device, can be actuated as desired both by a control signal that is proportional to the speed of rotation of the driving motor and predetermines the direction of displacement of the hydraulic pump and by a working pressure signal that is proportional to the working pressure in the working line then carrying the high pressure. To enable a load that has been decelerated to a standstill both to be maintained at a standstill and also to be shunted without mechanical braking, even when actuation of the displacement-direction control valve by the control signal is interrupted, the invention provides for switching over the working pressure signal applied to the displacement-direction control valve in the absence of the control signal.

13 Claims, 1 Drawing Sheet

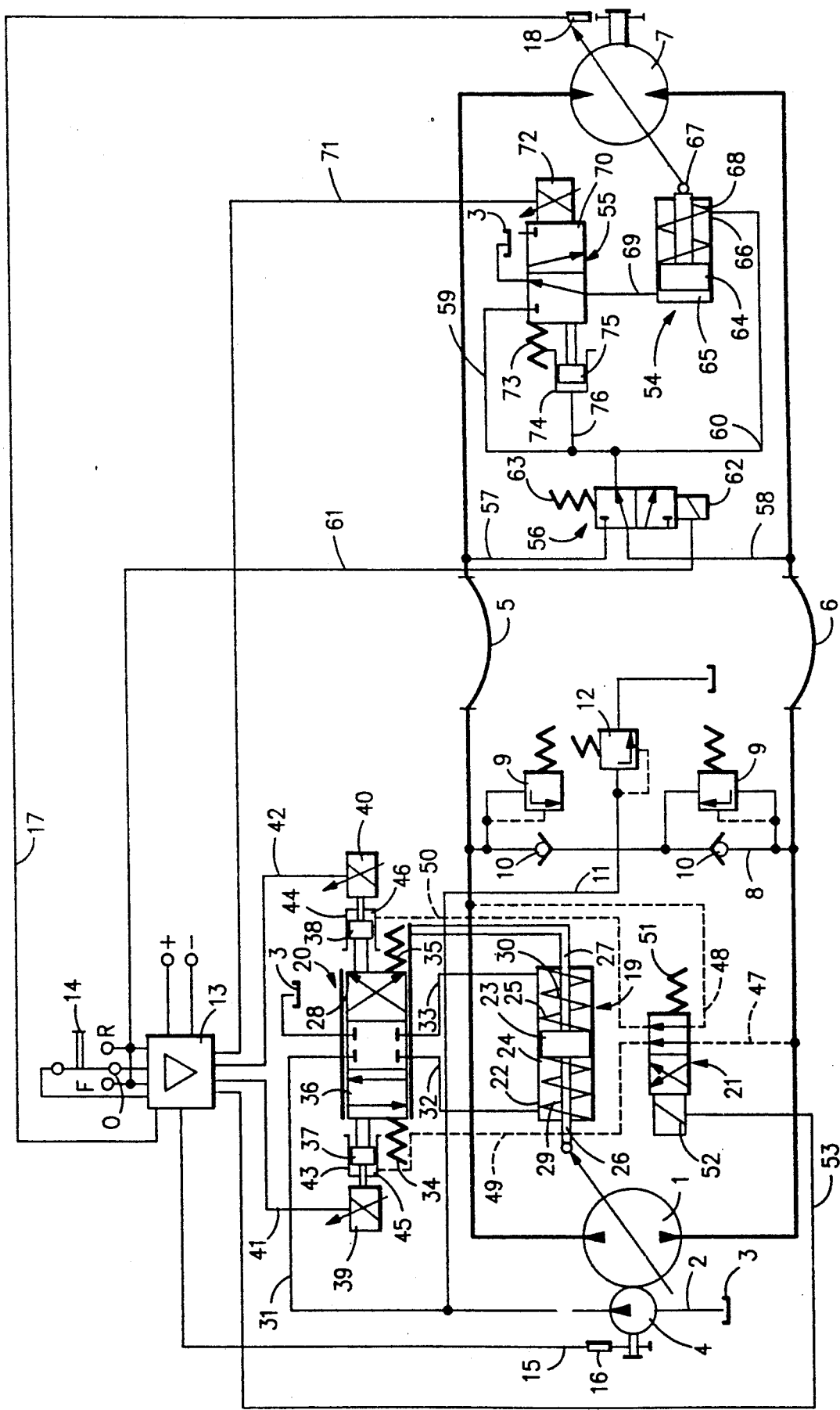

CONTROL AND REGULATING DEVICE FOR A HYDROSTATIC TRANSMISSION

TECHNICAL FIELD OF THE INVENTION

The invention relates to a control and regulating device for a hydrostatic transmission.

BACKGROUND OF THE INVENTION AND PRIOR ART

From DE-PS 35 39 220 a control and regulating device of this kind is known in which the switching device is connected to both working lines via a single working pressure signal line and a shuttle valve, has three gear positions, one being a blocking middle position, and, when an idling speed of the driving motor is exceeded, is actuated by the control signal through a travel-direction control valve to engage neutral or else forward or reverse gear if one of the latter gears is engaged. By this actuation the switching device is switched into one of the two outer gear positions according to the gear engaged, in order to act on the corresponding side of the displacement-direction control valve with the working pressure signal so that the adjusting device will tilt the hydraulic pump out into the appropriate direction of displacement.

In the absence of the control signal, i.e. at idling speed or with neutral engaged, actuation of the switching device by with the control signal ceases and the switching device is thereupon switched by pressure from a spring into the blocking middle setting in which it interrupts the action of the working pressure signal on the displacement-direction control valve, which is consequently neither actuated by the control signal nor acted on by the working pressure signal. Spring pressure adjusts the valve and thus, via the adjusting device, the hydraulic pump, into the zero setting. After the hydraulic pump has slowed to a standstill the hydraulic pump takes over the support against the effect of the load, which seeks to move under the acceleration of gravity. In practice, however, it has been found that after a fairly short time pressure losses, for example due to unavoidable leakage, occur in the working line carrying the high pressure, so that the hydraulic motor is not adequately supported by the hydraulic pump and consequently begins to rotate if the mechanical brake is not applied; the load can thus not be kept at a standstill in this way. This disadvantage can also occur as a result of other factors, for example, play in the hydraulic pump adjustment which prevents its exact setting to zero displacement volume. Thus under practical operating conditions secure and adequate support of the load cannot be guaranteed without the use of the mechanical brake. Furthermore it is not possible to accelerate the load against the acceleration due to gravity while maintaining the neutral setting. This procedure, which is here called "shunting", is particularly important for example in parking when the transmission is used in motor vehicles or for correcting the position of the load when the transmission is used in lifting devices.

OBJECT OF THE INVENTION

It is an object of the invention to further develop a hydrostatic transmission of the kind referred to so that even when actuation of the displacement-direction control valve by the control signal is interrupted a load that has been slowed down to a standstill can be both shunted and held securely at a standstill under practical operating conditions.

SUMMARY OF THE INVENTION

The switching device according to the invention makes it possible, when the control signal ceases, for example when the driving motor is idling, to switch the working pressure signal applied at the displacement-direction control valve to the other side of the valve and in this way to tilt the hydraulic pump into the direction of displacement required to maintain the high pressure in the working line that is carrying the high pressure, i.e. so to speak into reverse gear in the case of load deceleration from feed-back operation (i.e. with transfer of energy from the motor to the pump) and into forward gear in the case of load deceleration from operation under load (i.e. with transfer of energy from the pump to the motor). In this way it is also possible to hold the load securely at a standstill with the driving motor rotating in the idling setting on relatively steep slopes or inclined stretches. To shunt the load, i.e. to move backwards when the load is decelerated from feed-back operation and to move forwards when the load is decelerated from operation under load, it is only necessary to increase the speed of the driving motor and it is not necessary to actuate the displacement-direction control valve with the control signal.

In order to avoid abrupt deceleration of the load the switching device preferably does not switch over first until the hydraulic motor has come to a standstill. For this purpose a switching signal transmitter is provided for detecting the speed of rotation of the hydraulic motor and for producing a switching signal acting on the switching device in order to switch it over when the hydraulic motor is at a standstill.

The switching signal transmitter is advantageously connected to a displacement-direction control switch which can be set to two switching positions (forward gear and reverse gear) corresponding to the directions of displacement of the hydraulic pump, and to a neutral position, and which, when set to neutral, conducts the switching signal from the switching signal transmitter to the switching device.

A control signal transmitter for measuring the speed of rotation of the driving motor and for generating the control signal may be connected to the displacement-direction control switch which, in its two switching positions, conducts the control signal from the control signal transmitter to the respective side of the displacement valve.

According to a further embodiment of the invention an electrical control unit is associated with the direction of displacement switch and both the control signal and the switching signal are electrical signals.

The displacement-direction control valve is preferably operable on both sides by respective proportional magnets which can be actuated by the electrical control signal.

According to a further embodiment of the invention the displacement-direction control valve has a control chamber on each side which can be connected via the switching device to one of the working lines to be acted on, as a working pressure signal, by the working pressure prevailing in the working line carrying the high pressure.

The switching device preferably comprises a 4/2 way valve which may be a pilot valve or a continuously adjustable valve.

The displacement valve advantageously comprises a throttling 4/3 way valve and is held in a blocking inoperative position by spring centering.

The adjusting device may comprise a hydraulic cylinder having a synchronising piston that is centered by a spring. An arrangement in which the housing of the displacement valve is connected to the piston rod of the synchronising piston of the hydraulic cylinder for the purpose of returning it to the inoperative blocking position is advantageous.

BRIEF DESCRIPTION OF THE DRAWING

The drawing shows a schematic diagram of a hydrostatic transmission embodying this invention.

DETAILED DESCRIPTION OF A PREFERRED EMBODIMENT OF THE INVENTION

The invention will now be described in more detail, by way of example, with reference to a preferred embodiment shown in the drawing.

The drawing shows a circuit diagram of a hydrostatic transmission as a vehicle drive, for example for a wheel loader. This hydrostatic transmission comprises a hydrostatic variable displacement pump 1, for example an axial piston pump of the swashplate design, that is operable in two directions of displacement and is driven by a driving motor (not shown), for example a diesel motor, a hydrostatic auxiliary or fixed-displacement pump 4 mechanically connected to the variable displacement pump 1 and via a line 2 to the tank 3, a hydrostatic variable displacement motor 7, such as an axial piston motor of the bent axis design, which is connected via two working lines 5, 6 to the variable displacement pump 1, and a control and regulating device for the hydrostatic transmission which will be described below.

The two working lines 5, 6 are connected to one another by a line 8 to which two pressure limiting valves 9 are connected, each in a by-pass around a respective check valve 10 in the line 8. Since the two check valves 10 close in opposite directions the pressure limiting valves 9 limit the working pressure in the working line 5 or 6 that is carrying the high pressure.

The fixed displacement pump 4 serves as a feed and control pump. It is connected via a feed line 11 to the line 8 between the two check valves 10. To avoid exceeding the maximum feed pressure a pressure limiting valve 12 opening in the direction of the tank 3 is connected to the feed line 11.

The control and regulating device includes a first hydraulic system associated with the variable displacement pump 1, a second hydraulic system associated with the variable displacement motor 7 and a common electrical control unit 13 for both systems, having a displacement- or travel-direction control switch 14 which can be set manually to three positions, namely an idling position "zero", a forward gear "F" and a reverse gear "R". The control unit 13 is connected via a control signal line 15 to a control signal transmitter 16 on the input shaft of the variable displacement pump 1 and via a switching signal line 17 to a switching signal transmitter 18 on the output shaft of the variable displacement motor 7. The control signal transmitter 16 generates a control signal that is proportional to the speed of rotation of the driving motor. The switching signal transmitter 18 generates a switching signal that is proportional to the speed of rotation of the variable displacement motor 7.

The first hydraulic system includes an adjusting device 19 that can be acted on by an adjusting pressure for adjusting the volume and the direction of displacement of the variable displacement pump 1, a displacement- or travel-direction control valve 20 for controlling and regulating the action of the adjusting pressure on the adjusting device 19 and a switching device in the form of a non-throttling 4/2 way or pilot valve 21.

The adjusting device 19 comprises a double-acting hydraulic cylinder 22 in which a synchronising piston 23 bounds two pressure chambers 24, 25 and is coupled by way of one half 26 of a double-ended piston rod 26, 27 to the variable displacement pump 1, for example to its swashplate, and by the other half 27 to the housing 28 of the travel-direction control valve 20. The synchronising piston 23 is centered in the two pressure chambers 24 and 25 by means of respective centering springs 29 and 30 on the two halves 26, 27 of the piston rod.

The travel-direction control valve 20 is a spring-centered throttling 4/3 way valve having one port connected to the tank 3 and a further port connected via an adjusting pressure line 31 to the feed line 11. The two remaining ports are connected via respective adjusting pressure branch lines 32, 33 to the pressure chambers 24 and 25 respectively of the adjusting device 19.

In the (spring-centered) middle position of the travel-direction control valve 20, shown in the drawing, all four ports are closed so that the synchronising piston 23 of the adjusting device 19 likewise occupies its (spring-centered) middle position and thus the variable displacement pump 1 occupies its zero position with zero displacement.

In the right-hand end position of the travel-direction control valve 20 (as shown in the drawing) the left-hand pressure chamber 24 of the adjusting device 19 is connected completely to the adjusting pressure line 31 while the right-hand pressure chamber 25 is relieved to the tank 3. Accordingly, the variable displacement pump 1 is tilted into the direction of displacement or travel corresponding to the forward gear. In the left-hand end position of the valve 20 the connections are exchanged so that the variable displacement pump 1 is tilted into the direction of displacement or travel corresponding to the reverse gear.

The travel-direction control valve 20, spring-centered by means of a respective centering spring 34, 35 on each side, can likewise be operated on both sides both hydraulically by the action of a working pressure signal and electrically by actuation by means of the control signal. For this purpose its control spool 36 is provided at each end with a projection coupled via a respective intermediate piston 37, 38 to a respective actuation rod of a respective conventional proportional magnet 39, 40. The two proportional magnets 39, 40 are further connected via respective first and second continuing control signal lines 41, 42 to the control unit 13. Each of the intermediate pistons 37, 38 bounds a respective control chamber 45, 46 within respective cylinders 43, 44 with respective measuring surfaces facing away from the control spool 36. Each of the two control chambers 45, 46 can be connected to each of the two working lines 5, 6 via the pilot valve 21. For this purpose the working lines 5, 6 are connected via respective working pressure signal lines 47, 48 to two of the four ports of the pilot valve 21, the other two ports being connected via respective continuing working pressure signal lines 49, 50 to the two control chambers 45, 46.

A pressure spring 51 holds the pilot valve 21 in the zero position shown in the drawing, in which the upper working line 5 in the drawing is connected to the right-hand control chamber 44 and the lower working line 6 in the drawing is connected to the left control chamber 43 of the travel-direction control valve 20. In the switched position of the pilot valve 21 these connections are exchanged. A conventional proportional magnet 52, which is connected via a continuing switching signal line 53 to the control unit 13, serves to operate the pilot valve 21.

The second hydraulic system includes an adjusting cylinder 54 that can be acted on by the working pressure in the working line 5, 6 carrying the high pressure to adjust the intake volume of the variable displacement motor 7, a pilot valve 55 for controlling and regulating the pressure acting on the adjustment cylinder 54 and a non-throttling 3/2 way valve 56 having two ports connected via respective connection lines 57, 58 to the working lines 5 and 6, and one port connected via first and second continuing connection lines 59, 60 to the adjusting cylinder 54 and the pilot valve 55 respectively. In the zero position shown in the drawing the port connected to the lower working line 6 is open, while the port connected to the upper working line 5 is closed. In the switching position the latter port is open and the former is closed. To operate the 3/2 way valve 56 from the zero into the switching position a conventional proportional magnet 62, connected via an electric signal line 61 to the control unit 13, is provided. A compression spring 63 returns the 3/2 way valve 56 to the zero position.

The adjusting cylinder 54 is a single-operating cylinder in which a piston 64 bounds two pressure chambers 65, 66 and is coupled via its one-sided piston rod 67, which passes through the pressure chamber 66, to the variable displacement motor 7, e.g. to its cylinder drum. The pressure chamber 66 is connected to the second continuing connection line 60. A compression spring 68 arranged on the piston rod 67 in the right-hand pressure chamber 66 acts on the piston 64 and thus urges the variable displacement motor 7 in the direction of maximum intake volume.

The pilot valve 55 is a throttling 3/2 way valve having one port connected to the tank 3, one connected to the first continuing connection line 59 and one connected via a line 69 to the left-hand pressure chamber 65 of the adjusting cylinder 54. In the zero position shown in the drawing the connection of the pilot valve 55 to the non-throttling 3/2 way valve 56 is blocked and the left-hand pressure chamber 65 of the adjusting cylinder 54 is relieved to the tank 3. In the switching position the latter pressure chamber 65 is connected to the first continuing connection line 59 and the connection to the tank 3 is blocked. To operate the pilot valve 55 from the zero position into the switching position a conventional proportional magnet 72 connected to the control unit 13 via a third continuing control signal line 71 is provided on the right-hand side of its control piston 70. The pilot valve 55 is returned to the zero setting, when the proportional magnet 72 is de-energised, by the pressure of a compression spring 73 and in addition, as a pressure cut-off, by hydraulic action on the measuring surface, facing away from the pilot valve 55, of a piston 75 arranged in a cylinder 74, via a branch line 76 connected to the first continuing connection line 59.

The operation of the hydrostatic transmission fitted with the control and regulating device according to the invention is as follows:

During travel of the wheel loader an electrical control signal or a hydrostatic adjustment pressure signal is generated by the control signal transmitter 15 and by the fixed displacement pump 4. Both signals are proportional to the speed of rotation of the driving motor. The control signal line 15 is connected in the electrical control unit 13, depending on the direction of travel selected by the travel-direction control switch 14, to the first (left-hand) or to the second (right-hand) continuing control signal line 41 or 42 so that the left-hand or right-hand proportional magnet 39 or 40 is actuated by the control signal and, according to its strength, urges the control spool 36 of the travel-direction control valve 20 towards the right-hand or left-hand end position. Taking the example of forward travel, with increase in the speed of the driving motor, and thus increase in the strength of the control signal, the left-hand proportional magnet 39 is actuated more strongly by excitation of its coils, so that the control spool 36 of the valve 20 is displaced a corresponding amount to the right and the adjusting pressure line 31 is connected to the left-hand pressure chamber 24 of the adjusting device 18. The higher adjusting pressure corresponding to the speed of rotation of the driving motor now displaces the synchronizing piston 23 of the adjusting device 19 to the right and thereby tilts the variable displacement pump 1 further out in the direction of displacement corresponding to the forward gear. The synchronizing piston 23 thereby takes the housing 28 of the travel-direction control valve 20 with it in the same direction until the latter has reached the zero setting.

As soon as the variable displacement pump 1 is tilted to maximum displacement, with further increase of the speed of rotation of the driving motor the correspondingly stronger control signal from the control signal transmitter 16 is switched in the control unit 13 from the first continuing control signal line 41 to the third continuing control signal line 71. Since, on setting the travel-direction control switch 13 to forward travel, the control unit 13 at the same time moves the 3/2 way valve 56 into the switching position by actuating its proportional magnets 62 via the signal line 61 (when travelling backwards the 3/2 way valve 56 remains in its inoperative position because the high pressure side is changed), the upper working line 5 carrying the high pressure is connected to the left-hand pressure chamber 65 of the adjusting cylinder 54 and in this way the variable displacement motor 7 is tilted back towards smaller intake volume. The hydrostatic transmission is in the primary adjusting region when its transmission ratio is changed only by means of the variable displacement pump 1, and it is in the secondary adjusting region when its transmission ratio is changed only by adjusting the variable displacement motor 7.

When the maximum speed of rotation of the driving motor is reached the variable displacement motor 7 is set to minimum intake volume and thus the transmission ratio of the hydrostatic transmission is set to the highest value. When the order of the sequence of steps described above is reversed the transmission ratio is reduced.

If, as a result of excessive loading of the variable displacement motor 7, the measuring surface of the piston 75 is acted on by a pressure exceeding the adjusting force of the proportional magnet 73, the control piston 70 of the pilot valve 55 is displaced to the right and by means of the piston 64 of the adjusting cylinder 54 the variable displacement motor 7 is tilted towards maximum intake volume until the forces acting on the control piston 70 are in equilibrium.

This pressure cut-off and pressure control is effected in the same way by tilting the variable displacement pump 1 back towards zero displacement, since during forward and reverse travel the pilot valve 21 remains in its zero setting and acts on the control chamber (46 in the case of forward travel or 45 in the case of reverse travel) which is opposite the respective actuated proportional magnet (39 in the case of forward travel and 40 in the case of reverse travel).

At the same time, when the speed of rotation of the driving motor decreases, i.e. when changing from feedback to load operation, the pilot valve 21, which during travel remains in its zero setting, prevents the variable displacement pump from tilting back and in so doing prevents abrupt deceleration of the motor from occurring, especially in the neutral gear setting. In addition to the changeover of the high pressure side (from working line 5 to working line 6 in the case of forward travel) that occurs when changing to reverse-load operation, the hydraulic action on the control spool 36 of the travel-direction control valve 20 changes over, in the case of forward travel, from the control chamber 46 to the control chamber 45. In this way the action on the control spool 36 of the travel-direction control valve 20 that is reduced owing to the decrease in the speed of rotation of the driving motor and the consequent reduction of the control signal is substantially compensated by increased hydraulic action in the same direction, and hence the settings of the control spool 36 and of the variable displacement pump 1 assumed during the previous operation under load are substantially maintained.

As a further measure to prevent abrupt deceleration of the motor the intake volume of the variable displacement motor 7 can be held at a smaller value in the case of secondary adjustment and adjusted to a smaller value in the case of primary adjustment by eliminating the electric signal actuating the proportional magnet 62 of the 3/2 way valve and by actuating the pilot valve 55 by the control signal.

The variable displacement motor 7 can, however, also be tilted towards larger intake volume for more forceful utilization of the braking power of the driving motor by eliminating the control signal actuating the proportional magnet 72 of the pilot valve 55.

When the wheel loader that has been slowed down by the measures described above, possibly with the aid of the mechanical brake, has come to a standstill, by setting the travel-direction control switch 14 to the neutral "zero" position the switching signal from the switching signal transmitter 18 indicating that the variable displacement motor 7 is at a standstill is conducted via the switching signal line 17, the electric control unit 13 and the continuing switching signal line 53 to the proportional magnet 52 of the pilot valve 21, and the pilot valve 21 is thereby brought into the switching position. In this way, by means of the working pressure in the working line 5 or 6 then carrying the high pressure, the travel-direction control valve 20, and thus the variable displacement pump 1, is tilted into the direction of travel or displacement which is necessary to counter the high pressure in the respective working line.

If, for example, the wheel loader is decelerated to a standstill from operation under load, for example when travelling on an upward gradient, the pilot valve 21 that has been brought into the switching position connects the working line 5 that is still carrying the high pressure and is connected during travel to the right-hand control chamber 46, to the left control chamber 45 of the travel-direction control valve 20. The high pressure in the working line 5 then displaces the control spool 36 of the valve 20 towards the right-hand end position. The variable displacement pump 1, which has in this way been tilted into the direction of displacement corresponding to the forward gear, prevents the variable displacement motor 7 from rotating, despite the action of the weight of the wheel loader which wants to make it run back downhill. In this way the wheel loader is held securely at a standstill without mechanical braking even on relatively steep slopes while keeping the travel-direction control switch 14 in the neutral position and maintaining the idling speed of the driving motor. By increasing the speed of rotation of the motor the wheel loader is set in motion again against the effect of the earth's gravity, i.e. uphill.

It will be seen that the function of the pilot valve 21 is to act, so to speak, as a substitute for the changeover of the high pressure side in the working lines 5, 6 that does not take place, by a corresponding change in the hydraulic action on the travel-direction control valve 20.

In the same way no changeover of the high pressure side takes place if the decelerated wheel loader comes to a standstill from feed-back operation, for example when moving downhill. In this case by switching the pilot valve 21 from the zero setting into the switching position the hydraulic action on the travel-direction control valve 20 by the high pressure prevailing in the working line 6 is changed over from control chamber 45 to control chamber 46. The high pressure displaces the control spool 36 of the travel-direction control valve 20 towards the left-hand end position, so that the variable displacement pump 1 is tilted into the direction of displacement corresponding to the reverse gear. Thus the wheel loader is held securely at a standstill in the same way as in the case of a standstill on an upward slope, without mechanical braking, while maintaining the neutral setting of the travel-direction control switch 14 and without increasing the speed of rotation of the driving motor. As soon as the speed of rotation of the driving motor is increased the wheel loader again starts to move against the acceleration due to gravity, i.e. backwards.

What is claimed is:

1. A control and regulating device for a hydrostatic transmission, comprising:
    a variable volume hydraulic pump for pressurizing a hydraulic fluid, and having a first mode for discharging pressurized hydraulic fluid in a first direction, and a second mode for discharging pressurized hydraulic fluid in a second direction;
    means to connect the hydraulic pump to a driving motor to drive the hydraulic pump, the driving motor having a speed of rotation;
    at least one hydraulic motor;
    first and second working fluid lines for conducting pressurized hydraulic fluid between the hydraulic pump and the hydraulic motor to drive the hydraulic motor. the first working line receiving the pressurized hydraulic fluid from the hydraulic pump when the pup is in the first mode, and the second working line receiving the pressurized hydraulic fluid from the hydraulic pump when the pump is in the second mode;

adjusting means connected to the hydraulic pump to control the mode of the pump and the volume thereof;

means for applying an adjusting pressure to the adjusting means, and including a control valve for controlling and regulating the adjusting pressure applied to the adjusting means, the control valve having first and second control positions;

switching means connected to the control valve to change the control valve between the first and second positions thereof;

means to generate a control signal proportional to the speed of rotation of the driving motor, and to selectively conduct the control signal to the switching means;

means to generate a working pressure signal proportional to the pressure of the hydraulic fluid in the one of the working fluid lines conducting pressurized fluid from the hydraulic pump to the hydraulic motor, and including first and second pressure lines connecting the switching means to the first and second working fluid lines respectively;

wherein the switching means applies the working pressure signal to the control valve in one of two opposite directions; and wherein the switching means has first and second positions, and when the control signal is not conducted to the switching means, the switching means changes from one of the positions thereof to the other of the positions thereof to conduct the working pressure signal to the control valve to change the control valve form one of the positions thereof to the other of the positions thereof.

2. A control and regulating device according to claim 1, wherein said control valve is a 4/3 way throttling valve and is held in a blocking inoperative position by spring-centering.

3. A control and regulating device according to claim 1, wherein the adjusting means comprises a hydraulic cylinder having a spring-centered synchronizing piston.

4. A control and regulating device according to claim 3, wherein for the purpose of returning the control valve to the inoperative position its housing is connected to the piston rod of said synchronising piston.

5. A control and regulating device according to claim 1, wherein:
the hydraulic motor has a standstill condition; and
the switching means does not change from said one of the positions thereof to said other of the positions thereof until the hydraulic motor has come to the standstill condition.

6. A control and regulating device according to claim 5, wherein:
the hydraulic motor has a speed of rotation; and
further comprising a switching signal transmitter to sense the speed of rotation of the hydraulic motor, to generate a switching signal when the hydraulic motor is at the standstill condition, and to transmit the switching signal to the switching means to change said switching means from said one of the positions thereof to said other of the positions thereof.

7. A control and regulating device according to claim 6, wherein:
the hydraulic pump has a third, neutral mode;
further comprising a displacement-direction control switch having first, second, and third positions corresponding to the first, second, and third modes of the hydraulic pump; and
when the displacement-direction control switch is in the third position thereof, the displacement-direction control switch conducts the switching signal from the switching signal transmitter to the switching means.

8. A control and regulating device according to claim 7, wherein:
the means to generate the control signal is connected to and transmits the control signal to the displacement-direction control switch;
the adjusting means has first and second opposite sides; and
when the displacement-direction control switch is in one of the first and second positions thereof, the control switch conducts the control signal to a respective one of the first and second sides of the adjusting means.

9. A control and regulating device according to claim 8, wherein:
the displacement-direction control switch comprises an electrical control unit; and
both the control signal and the switching signal are electrical signals.

10. A control and regulating device according to claim 9, wherein:
the control valve has first and second opposite sides;
further comprising first and second proportional magnets connected to the first and second sides of the control valve respectively; and
the electrical control unit is connected to the first and second magnets to conduct the control signal selectively thereto.

11. A control and regulating device according to claim 1, wherein:
the control valve has first and second sides, and a respective control chamber on each of said sides;
the switching means is adapted to connect each of said control chambers to a respective one of the working fluid lines to apply to the control valve the pressurized hydraulic fluid from the one of working fluid lines receiving the pressurized hydraulic fluid form the hydraulic pump.

12. A control and regulating device according to claim 11, wherein said switching devices is a 4/2 way valve.

13. A control and regulating device according to claim 12, wherein said 4/2 way valve is a pilot valve or a continuously adjustable valve.

* * * * *